No. 720,860. PATENTED FEB. 17, 1903.
F. VON TRÜTZSCHLER.
APPARATUS FOR FACILITATING LEARNING TO RIDE BICYCLES.
APPLICATION FILED JUNE 9, 1902.
NO MODEL.
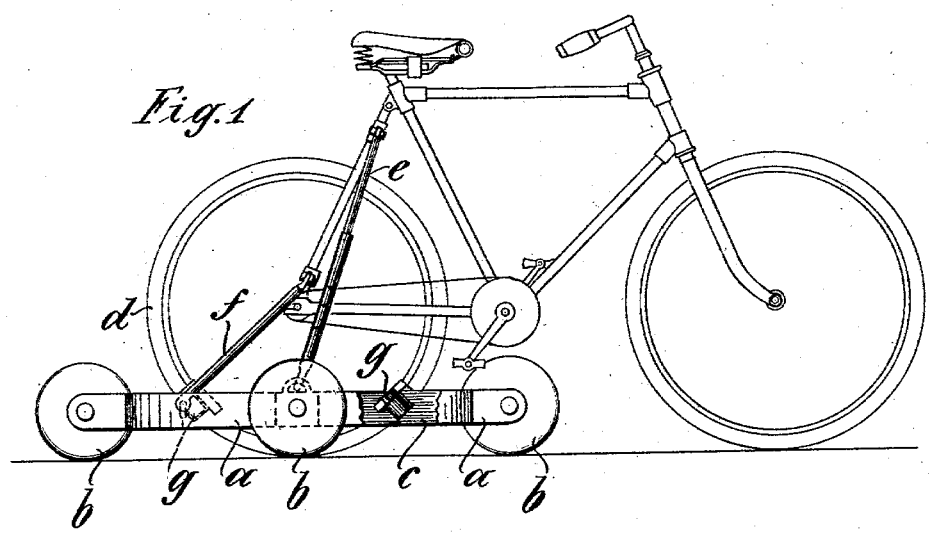
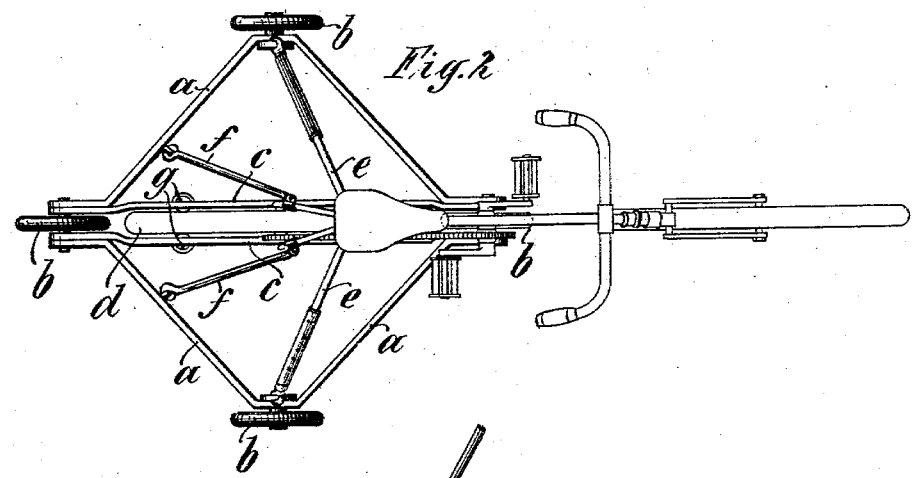
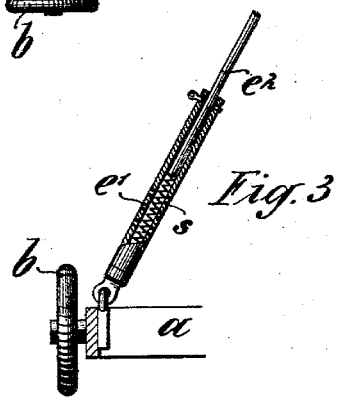
Witnesses:
Inventor: Fritz von Trützschler
By Marion & Marion
Attorneys.

United States Patent Office.

FRITZ VON TRÜTZSCHLER, OF WISMAR, GERMANY.

APPARATUS FOR FACILITATING LEARNING TO RIDE BICYCLES.

SPECIFICATION forming part of Letters Patent No. 720,860, dated February 17, 1903.

Application filed June 9, 1902. Serial No. 110,835. (No model.)

*To all whom it may concern:*

Be it known that I, FRITZ VON TRÜTZSCHLER, lieutenant, a citizen of the Grand Duchy of Mecklenburg, and a resident of Wismar, Germany, (whose post-office address is Linden-Allee 26,) have invented certain new and useful Improvements in Apparatus for Facilitating Learning to Ride Bicycles, of which the following is a specification.

The object of the present invention is an apparatus easily attachable to any bicycle for the purpose of facilitating the learning to ride.

It comprises a light frame serving as a carriage, within which the hind wheel of the bicycle is placed, and is connected to the cycle by two supporting-rods and two draw-rods. By this means the cycle is assured against falling over, and the cyclist can mount and ride without other assistance. As the rider progresses in his ability to ride the machine the spring connection between the support and the cycle can be loosened and more independence given to the rider.

In the accompanying drawings, Figure 1 is a side elevation, Fig. 2 a top plan, and Fig. 3 is a detail, partly in elevation and partly in section, showing the construction and connection of one of the telescopic rods.

Like letters of reference indicate like parts in the several views.

In carrying out my invention I employ a frame $a$, having at each of the four corners a wheel $b$. In the direction of a diagonal two parallel bars $c\ c$ are placed, between which the hind wheel revolves. In order to prevent any friction which might injure the tire, the rollers $g\ g$ are provided. Near the side wheels are attached the supports $e\ e$, whose free ends are connected in an easily-detachable manner with a part of the cycle-frame, (preferably the hind fork,) so that the entire construction possesses a certain rigidity. The two draw-rods $f\ f$ aid in drawing the frame along.

In order to afford the rider more independence in proportion as he gains skill, the rods $e\ e$ are preferably made of two parts $e'$ and $e^2$. (See Fig. 3.) These parts are arranged to telescope one into the other and are maintained in their right position by means of a spiral spring $s$. According to the tension allowed this spring the cycle will have more or less freedom to incline sidewise.

What I claim is—

1. In a device for the purpose described, a rectangular frame, a wheel at each corner thereof, means for attachment of the same to the frame, of a bicycle at the hind wheel, and draw-rods attached to opposite sides of said frame, substantially as described.

2. A device for the purpose described comprising a light frame mounted upon wheels, means for attaching the same to the frame upon opposite sides of the hind wheel, and rollers carried by said frame to be engaged by the tire of said wheel.

3. A device for the purpose described, comprising a frame mounted on rollers, telescopic spring-held rods attached to said frame for connecting it to the frame of a bicycle, parallel bars disposed lengthwise of said frame to embrace the hind wheel of the bicycle, and draw-rods attached to the opposite sides of the wheeled frame.

In testimony whereof I affix my signature in presence of two witnesses.

FRITZ VON TRÜTZSCHLER.

Witnesses:
 WOLDEMAR HAUPT,
 HENRY HASPER.